Dec. 29, 1942.   H. A. POTSDAM   2,306,979
AUTOMATIC CONTROL FOR ELECTRIC STOVES
Filed June 2, 1941
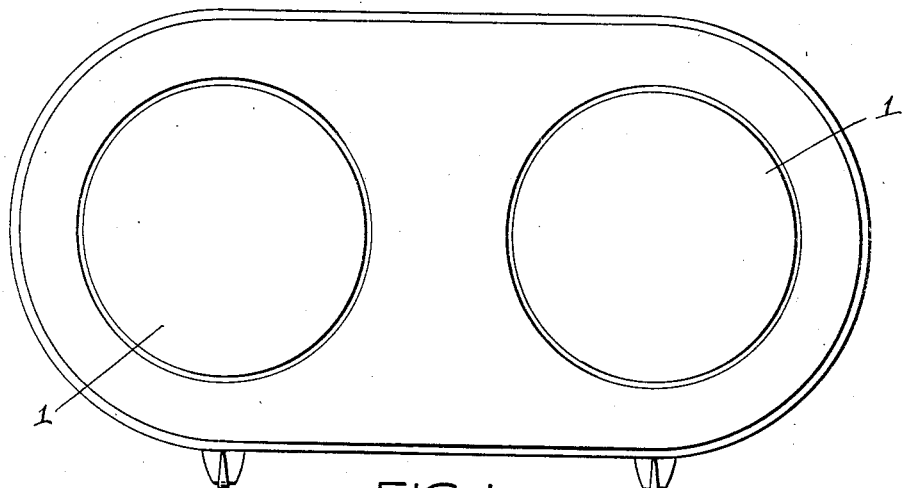
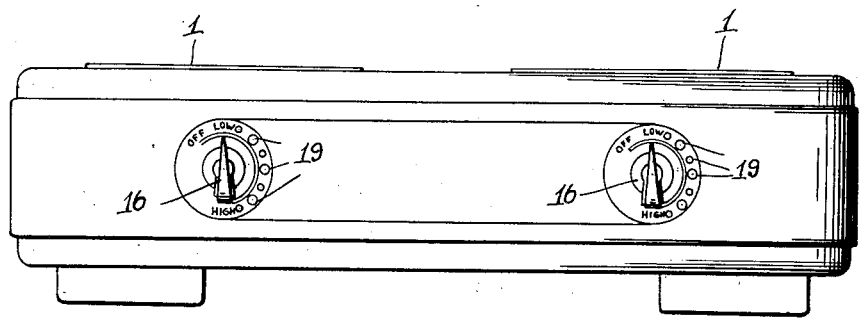
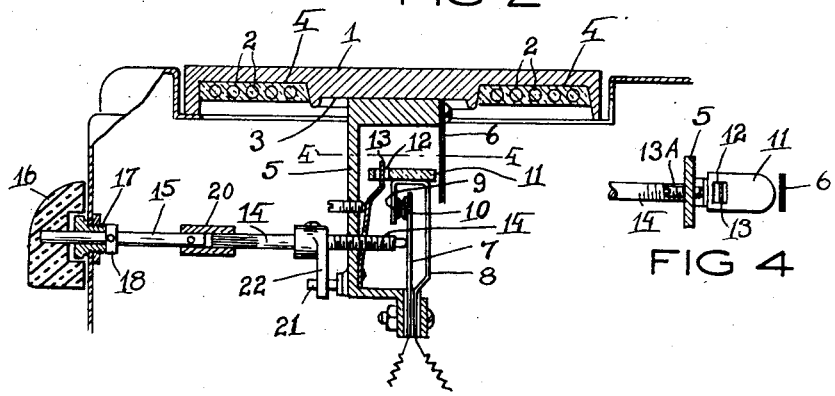
INVENTOR
HAROLD A. POTSDAM
BY
ATTORNEY Patented Dec. 29, 1942

2,306,979

UNITED STATES PATENT OFFICE 2,306,979

AUTOMATIC CONTROL FOR ELECTRIC STOVES

Harold A. Potsdam, Rochester, N. Y., assignor to Samson United Corporation, Rochester, N. Y., a corporation of Delaware Application June 2, 1941, Serial No. 396,240

1 Claim. (Cl. 219—37)

This invention relates to electric stoves and more particularly to the heat control thereof and the principal object of the invention is to provide the hot plate of an electric stove with a novel automatic heat control with which the temperature of the cooking surface of the hot plate may be regulated to provide substantially constant predetermined cooking temperatures.

A further object of this invention is to provide a novel arrangement of the heat control on the hot plate in order to have it function to provide substantially constant cooking temperatures for the cooking surface of the hot plate.

These and other objects and attendant advantages of the invention will become more readily apparent from the detailed description thereof which follows, reference being had to the accompanying drawing in which—

Figure 1 is a top plan view of an electric stove embodying the novel heat control forming the subject matter of the present invention.

Figure 2 is a front elevation thereof.

Figure 3 is an enlarged vertical section of a portion of the stove including a hot plate and its automatic heat control.

Figure 4 is a detail sectional view of the heat control, the section being taken on the line 4—4 in Figure 3.

To make the operation of an automatic control for the hot plate of an electric stove practical so that it provides substantially constant predetermined cooking temperatures on its cooking surface, it is essential that the thermo-responsive element be located on the hot plate to properly respond to the temperature changes of the hot plate and thus keep the hot plate at the desired temperature at all times.

For this reason the hot plate 1 is provided with heating coils 2, 2 which are concentrically arranged around a central supporting surface 3 at the bottom of the hot plate. The heating coils are arranged in a channel 4 in the bottom of the hot plate in which they are preferably embedded in suitable cement. In this way the temperature of the hot plate produced by the heating coils is transmitted to the cooking surface of the hot plate and heats its center to provide the same temperature on the supporting surface 3 at the bottom of the hot plate that it provides in the center of the cooking surface at the top of the hot plate.

Regulating the heating coils to provide the desired temperature for the central portion of the hot plate will thus cause the controlling mechanism to keep the temperature of the hot plate constant at the desired temperature.

The controlling mechanism comprises the bracket 5 which has its base suitably attached to the central supporting surface 3 on the underside of the hot plate so as to project downwardly therefrom for the support of the switch mechanism at the free end thereof. The thermo-responsive member 6 is fastened to the base of the bracket with one end adjacent to the bottom of the hot plate so as to project from it parallel to the bracket and suitably spaced from it. The switch mechanism comprises a pair of switch members 7 and 8, one end of each of which is fastened to the bottom end of the bracket 5 electrically insulated from it and from each other.

The switch members comprise spring fingers of which finger 8 has an inverted U shaped upper portion which extends over the top of the spring finger 7 and down to one side thereof where it carries a contact button 9 for normally yielding contact with the contact button 10 carried by the spring finger 7. The inverted U shaped top of the spring fingers 8 has attached thereto the block 11 which is made up of electric insulating material such as porcelain and is provided with an aperture 12. A stop finger 13 carried by the bracket 5 projects thru the aperture 12 and is adjustable therein to limit the movement of the switch member relative to the switch member 7. Adjustment of the stop finger is effected by the adjusting screw 13A which is threaded thru the bracket 5.

The position of the switch member 7 is adjustably set by the adjusting screw 14 which is threaded thru the bracket 5 for engagement with the switch member 7 below the contact button 9 thereof. The adjusting screw 14 is splined to an extension rod 15 for operation by the knob 16. In this way the knob 16 may be rotated without being affected by the endwise movement of the adjusting screw 14 in its adjusting movement of the switch finger 7. The extension rod is journaled in the bushing 17 and held against endwise movement by the collar 18 on the inside of the wall of the oven and the operating knob 16 on the outside thereof. The indicating knob 16 cooperates with suitable indications 19, 19 to indicate the various cooking temperatures at which the hot plate may be automatically maintained by the thermo-responsively controlled switch mechanism.

The solid center portion ideally locates the automatic heat regulating mechanism because the heat generated by the heating coils is concentrated and stored in this center portion of increased mass and is thus not subject to rapid temperature changes.

Changes in the temperature of the center portion of the stove plate cause the member 6 to respond thereto so that its movement caused by the increase in temperature of the stove plate brings the member in contact with the block 11 and thereby moves the switch member 8 to have its contact button 9 separate from the contact button 10 and break the electric circuit between them. As the contact buttons 9 and 10 are yieldingly held together by their respective switch members, location of the contact button 10 by means of the adjusting screw determines the point at which the electric circuit is opened in the regulation of the temperature of the hot plate. When the indicating knob is turned to a high heat position, the adjusting screw is moved to cause the switch member 7 to swing to the left in Figure 3 to a position in which the thermo-responsive member requires a correspondingly high heat created by the heating coils in the hot plate to move into contact with the block 11 to thus operate the switch member 8 to open the electric circuit between the contact buttons 9 and 10 only after this "high heat" of the hot plate has been reached. Any drop in the temperature of the hot plate, of course, will quickly cause the thermo-responsive member to again close the circuit so that by opening and closing the circuit in this manner the switch automatically causes the heating coils to keep the temperature of the hot plate at the temperature indicated by the indicating knob.

When the indicating knob is set to its "off" position to shut off the electric current from the heating coils of the hot plate the adjusting screw forces the switch member to the right in Figure 3 to separate the contact buttons 9 and 10. To make this possible the stop finger 12 is set to permit but a limited movement of the switch member 8 with the switch member 7 at the end of which the stop finger engages the end of the aperture and thereby arrests a further movement thereof while the switch member 7 continues its movement by the adjusting screw until its contact button 10 has moved away from the contact button 9 and has opened the electric circuit between them.

To keep heat from the thermostatic switch from being transmitted to the operating knob 16, the sleeve 20 which splines the adjusting screw 14 to the extension rod 15 may be of suitable heating insulating material.

To prevent the adjustment of the thermo-responsive switch beyond its "high" heat position, a stop pin 21 is carried on the bracket 5 for engagement by the arm 22. The latter is mounted on the adjusting screw so that it contacts the stop pin when the adjusting screw has set the switch to the "high" heat position.

I claim:

In an electric stove the combination of a hot plate, a casing surrounding and supporting said hot plate, a cooking surface covering the top of said hot plate, a restricted supporting surface provided at the bottom of said hot plate, heating coils embedded in said hot plate and surrounding said supporting surface, a thermo-responsive element projecting from said supporting surface, a switch mounted on said supporting surface adjacent said thermo-responsive element, an adjustable and a movable contact embodied in said switch, an adjusting screw movable endwise for adjustment of said switch, an extension rod mounted to rotate in said casing and held against endwise movement substantially in alignment with said adjusting screw, spline means connecting said extension rod with said adjusting screw to provide for endwise movement of said adjusting rod on the rotation of said extension rod, and means for rotating said extension rod said movable contact being arranged for movement by said thermo-responsive element relative to said adjustable contact, and movement limiting means for limiting the movement of said movable contact by said thermo-responsive element.

HAROLD A. POTSDAM.